US009920605B2

(12) United States Patent
Hoffman

(10) Patent No.: US 9,920,605 B2
(45) Date of Patent: Mar. 20, 2018

(54) FRAC AND STORAGE TANK EXCHANGER

(71) Applicant: Hydra Heating Industries, LLC, Atlanta, GA (US)

(72) Inventor: Michael Hoffman, Atlanta, GA (US)

(73) Assignee: Hydra Heating Industries, LLC, Atlanta, GA (US)

( * ) Notice: Subject to any disclaimer, the term of this patent is extended or adjusted under 35 U.S.C. 154(b) by 679 days.

(21) Appl. No.: 14/526,204

(22) Filed: Oct. 28, 2014

(65) Prior Publication Data

US 2015/0128880 A1    May 14, 2015

Related U.S. Application Data

(60) Provisional application No. 61/902,311, filed on Nov. 11, 2013, provisional application No. 62/041,104, filed on Aug. 24, 2014, provisional application No. 62/044,266, filed on Aug. 31, 2014.

(51) Int. Cl.

| | | |
|---|---|---|
| *E21B 43/24* | (2006.01) | |
| *F28D 1/02* | (2006.01) | |
| *F28C 3/04* | (2006.01) | |
| *F01K 5/02* | (2006.01) | |
| *B60P 3/22* | (2006.01) | |
| *F28F 9/013* | (2006.01) | |

(52) U.S. Cl.
CPC ............ *E21B 43/2405* (2013.01); *F01K 5/02* (2013.01); *F28C 3/04* (2013.01); *F28D 1/022* (2013.01); *F28D 1/0213* (2013.01); *B60P 3/2295* (2013.01); *F28F 9/013* (2013.01)

(58) Field of Classification Search
CPC .................................................. E21B 43/2405

USPC ......... 165/173, 67, 68, 162, 178; 405/129.4; 248/67.7, 49–74.5; 138/89; 166/177.5
See application file for complete search history.

(56) References Cited

U.S. PATENT DOCUMENTS

| | | |
|---|---|---|
| 4,502,392 A | 3/1985 | Rosenberger |
| 4,569,805 A | 2/1986 | Hume et al. |
| 4,573,803 A * | 3/1986 | Gritters .................. B01F 5/045 |
| | | 137/890 |

(Continued)

OTHER PUBLICATIONS

International Search Report and Written Opinion, dated Mar. 26, 2015 for PCT/US2014/063468.

*Primary Examiner* — Steven B McAllister
*Assistant Examiner* — Ko-Wei Lin
(74) *Attorney, Agent, or Firm* — Thomas Horstemeyer, LLP

(57) ABSTRACT

An exchanger for a tank is described herein. The exchanger may be relied upon in a trailer tank, for example, or any other type of tank that stores fluid. The exchanger includes an inlet, a central fluid conduit, one or more exchanger extension arms having fluid apertures that direct fluid into a tank at various locations, and one or more supports that support the central fluid conduit and the exchanger extension arms. The fluid apertures may be positioned relatively evenly across the exchanger extension arms and/or the central conduit to direct fluid up or at various directions into the tank. Thus, fluid pumped into the inlet of the exchanger may flow through the central conduit, into the exchanger extension arms, and out through the fluid apertures at various locations into the tank. As such, heated fluid, for example, may be more evenly and quickly distributed into the tank.

20 Claims, 6 Drawing Sheets

(56) References Cited

U.S. PATENT DOCUMENTS

| | | | | |
|---|---|---|---|---|
| 5,290,127 | A * | 3/1994 | Foster | F16L 1/20 |
| | | | | 248/49 |
| 6,375,250 | B1 * | 4/2002 | McWilliams | B60P 1/28 |
| | | | | 296/183.1 |
| 8,387,805 | B2 | 3/2013 | Olivier | |
| 2010/0025407 | A1 | 2/2010 | Benson | |
| 2010/0147860 | A1 * | 6/2010 | McKenzie | E21B 43/26 |
| | | | | 220/626 |
| 2013/0150268 | A1 | 6/2013 | Oldham | |

* cited by examiner

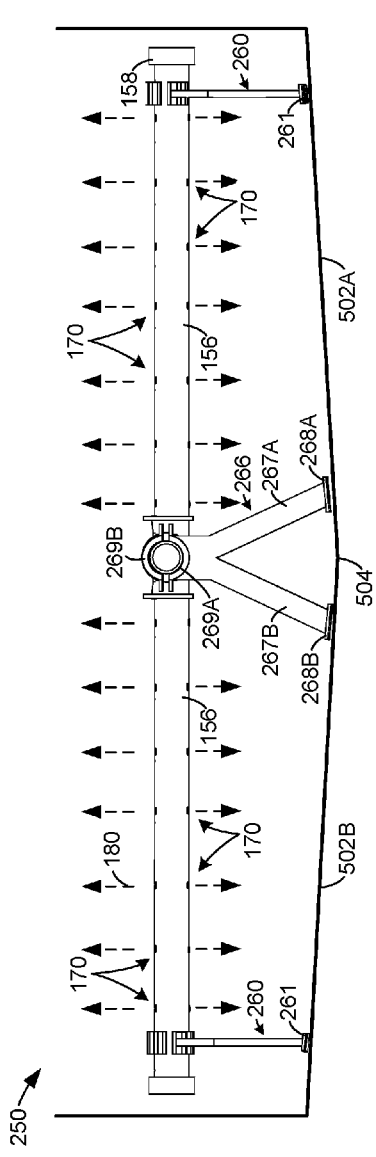
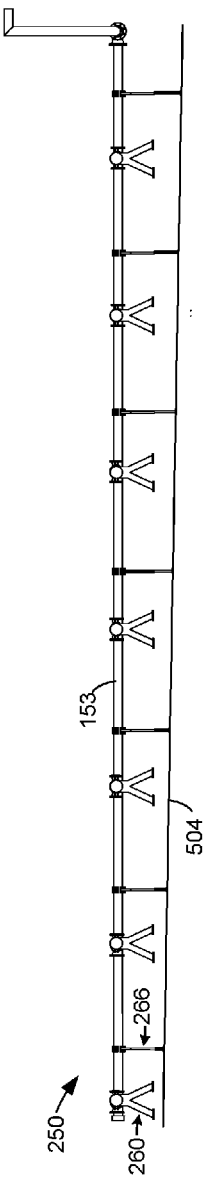

FRAC AND STORAGE TANK EXCHANGER

CROSS-REFERENCE TO RELATED APPLICATIONS

This application claims the benefit of U.S. Provisional Application No. 61/902,311, filed Nov. 11, 2013, titled "Sparge Heating System for Frac Water Tanks," U.S. Provisional Application No. 62/044,266, filed Aug. 31, 2014, titled "Heat Exchanger for Frac Pools and Ponds," and U.S. Provisional Application No. 62/041,104, filed Aug. 24, 2014, titled "Heat Exchanger for Frac Tanks," the entire contents of each of these applications is hereby incorporated herein by reference.

BACKGROUND

Fluid storage tanks, such as trailer tanks or frac tanks, may be used to provide storage for fluid at various locations, such as at drilling sites for oil and gas wells, manufacturing facilities, warehouses, user facilities (e.g., biodiesel storage for farms), trans loading facilities, municipal and public works locations, etc. In this context, a trailer tank may be towed to a temporary location by a tow vehicle. At the drilling site, the trailer tank may be unhooked from the tow vehicle and positioned at a suitable location to be filled with fluid. When positioned at the suitable position on stable ground, the trailer tank can be filled with fluid for storage and dispensing. Other types of tanks may be stationary, in ground, above ground, round, rectangular or square.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

FIG. 5A illustrates an end view of the example exchanger in FIG. 4 according to another embodiment of the present disclosure.

FIG. 5B illustrates a side view of the example exchanger in FIG. 4 according to another embodiment of the present disclosure.

DETAILED DESCRIPTION

Figure 1:
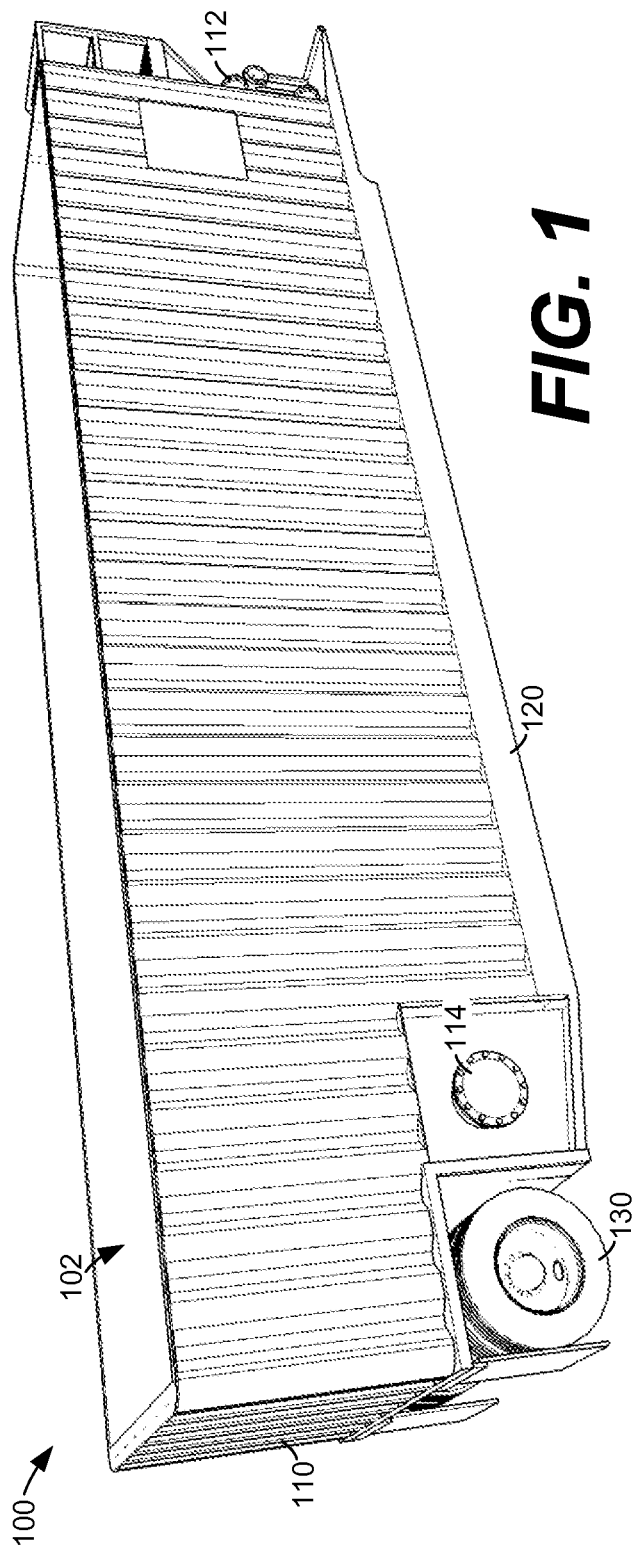
FIG. 1 illustrates a perspective view of an example tank according to one embodiment of the present disclosure.

As noted above, tanks may be used to provide storage for fluid at various locations such as drilling sites for oil and gas wells, for example. When located and positioned at a suitable position, a tank can be filled with fluid for storage and dispensing. Examples of fluids that may be stored in tanks include fracking liquids, drilling mud, fluids from environmental cleanup, water, brine, etc. As used herein, the term "fluid" includes any material or composition of materials of suitable viscosity to flow into and/or out of a storage tank, with or without pumping. Thus, the term "fluid" is intended to include any flowing mixture, suspension, slurry, or combination of materials.

Depending upon the needs at the site, it may be desirable or necessary to heat or mix the fluid stored in a tank. For example, in hydraulic fracturing, heated fluid is pumped into wells to stimulate the wells for the removal of oil and/or gas deposits. However, because of the volume of fluid stored in a tank, it may be difficult to evenly disperse or diffuse heated fluid throughout the tank if the fluid is merely fed into a fill port at one end of the tank, for example.

Generally, a fluid storage tank, such as a trailer tank or frac tank, includes a storage tank, at least one fill port, and at least one drain port. If fluid is circulated from the drain port of the tank, heated by a fluid heater, and then fed into the fill port of the tank, the fluid surrounding the side or end of the tank nearest the fill port may become relatively warmer while the fluid further away from the fill port may remain relatively cooler. This manner of injecting a heated fluid into the fill port of the tank is, thus, a relatively inefficient and ineffective method of heating the fluid in the tank, wasting time and resources.

In the context described above, a heat exchanger is described herein. The heat exchanger may be relied upon in a tank, such as a trailer tank or frac tank, for example, to more evenly distribute and diffuse fluid into the tank. When a heated fluid is pumped into the tank, the heat exchanger helps to more evenly distribute and diffuse the heated fluid into the tank. Overall, the volume of fluid in the tank may be more evenly and quickly brought to a desired temperature when using the heat exchanger. Thus, the heat exchanger may be relied upon to save time and resources when heating fracking liquids, for example, or other fluids that may be stored in the tank. The same principles apply when using the exchanger for mixing fluids. The exchanger may also be used to promote or reduce phase change in fluids, to cool fluids or gasses that are too hot, and/or to heat phase changed materials (e.g. turning ice to water).

As described in further detail below, the heat exchanger includes an inlet, at least one central fluid conduit in fluid communication with inlet, one or more heat exchanger extension arms each extending from the central conduit and having fluid apertures that direct fluid into a storage tank at various locations, and one or more heat exchanger supports that support the at least one central fluid conduit and the heat exchanger extension arms. In various embodiments, the fluid apertures may be positioned relatively evenly across the heat exchanger extension arms and/or the central conduit and direct fluid up or at various directions into the storage tank. Thus, fluid pumped into the inlet of the heat exchanger may flow through the central conduit, into the heat exchanger extension arms, and out through the fluid apertures at various locations within the tank. As such, heated fluid, for example, may be more evenly and quickly distributed into the tank.

Turning now to the drawings, various structural and functional aspects of the embodiments are described in further detail.

FIG. 1 illustrates a perspective view of an example tank 100 according to one embodiment. It should be appreciated that the tank 100 illustrated in FIG. 1 is provided by way of example only. In other words, the embodiments of exchangers described herein may be used in any type of storage tank, and the tank 100 (e.g., trailer-type tank) is only representative of one type of storage tank in which the exchangers may be used.

The tank 100 includes a storage tank 102 surrounded by tank walls 110, a tank base 120, and wheels 130. The tank exchanger 100 also includes at least one fill port 112 and at least one drain port 114. The tank 100 may be formed from steel or any other material suitable for the application. The tank walls 110 may be formed from corrugated steel plate, pig iron, plastic or other materials, formed into a rectangular tank structure, and welded along one edge to the tank base 120. Inside the tank walls 110, a liner for the storage tank 102 may or may not be relied upon to separate or insulate the storage tank 102 from the tank walls 110, as some tanks are single walled. Generally, the wheels 130 of the tank 100 may be relied upon to transport and position the tank 100 to any suitable location.

Figure 2:
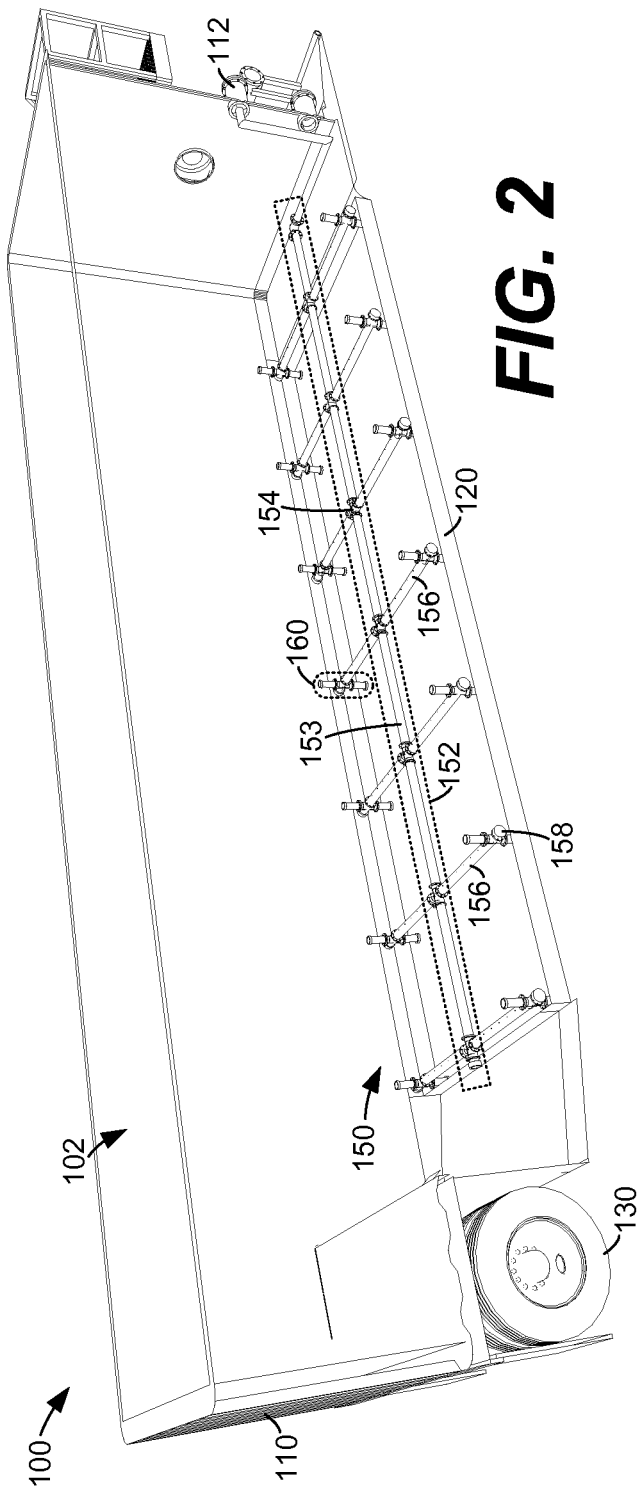
FIG. 2 illustrates a perspective view of the example tank in FIG. 1 with a cutaway to show an example exchanger within the tank according to one embodiment of the present disclosure.

FIG. 2 illustrates a perspective view of the tank 100 in FIG. 1 with a cutaway of one of the walls 110 of the tank 100 to show an example exchanger 150 according to one embodiment. The exchanger 150 may be referred to as a heat exchanger because it may be relied upon to evenly distribute or disperse heated fluid throughout the tank 100. It should be appreciated, however, that the exchanger 150 may be relied upon to evenly distribute any type of fluid throughout the tank 100. For example, the exchanger 150 may be relied upon to evenly distribute or disperse a brine solution having a higher concentration of salt into fresh water stored within the tank 100.

As illustrated in FIG. 2, the exchanger 150 extends over at least a portion of the storage tank 102 of the tank 100. In various embodiments, the exchanger 150 may extend over or across a greater or smaller extent of the storage tank 102. In other words, the exchanger 150 may vary in overall size and shape among embodiments. The exchanger 150 includes at least one central fluid conduit 152 that extends longitudinally down the center or near-center of the storage tank 102 and is in fluid communication with the fill port 112 of the tank 100. It is noted that the central fluid conduit 152 may be connected to the fill port 112 at either or both ends among embodiments. Here, it is noted that the exchanger 150 may include more than one central, main, or feeding line or arm in various embodiments, and the particular configuration of the exchanger 150 may be customized to certain tank dimensions so that fluid is evenly dispersed throughout. The central fluid conduit 152 includes various central fluid conduit segments 153 joined together at joints 154. The exchanger 150 further includes exchanger extension arms 156 that extend from the joints 154 of the central fluid conduit 152 toward the tank walls 110. As illustrated, caps 158 may be relied upon close off open ends of the central fluid conduit 152 and the exchanger extension arms 156. The exchanger 150 also includes exchanger supports 160 that support at least one of the central fluid conduit and the exchanger extension arms 156. As described in further detail below with reference to FIG. 3, one or more of the exchanger extension arms 156 include fluid apertures that direct fluid into the storage tank 102. In certain embodiments, one or more of the central fluid conduit segments 153 may also include fluid apertures that direct fluid into the storage tank 102.

The central fluid conduit 152 and the exchanger extension arms 156 may be embodied as tubes or pipes formed from metal, metallic alloys, plastic, or any other material suitable for the application of directing fluid. Similarly, the joints 154 and the exchanger supports 160 may also be formed from metal, metallic alloys, plastic, or any other material suitable for the purpose. As further described below, the tubes may include flanges or threads at one or both ends.

In operation, fluid may be pumped into the fill port 112 of the tank 100 and, thus, into the central fluid conduit 152 of the exchanger 150. In turn, the fluid will be directed into the exchanger extension arms 156 and, ultimately, out from the fluid apertures in the exchanger extension arms 156. The fluid apertures may be positioned relatively evenly across the exchanger extension arms 156 and/or the central fluid conduit 152 and direct fluid into the storage tank 102 at various spaced-apart locations. Thus, fluid pumped into the exchanger 150 may flow through the central conduit 152, into the exchanger extension arms 156, and out through the fluid apertures at various locations within the storage tank 102. As such, heated fluid, for example, may be more evenly distributed into the storage tank 102.

Figure 3:
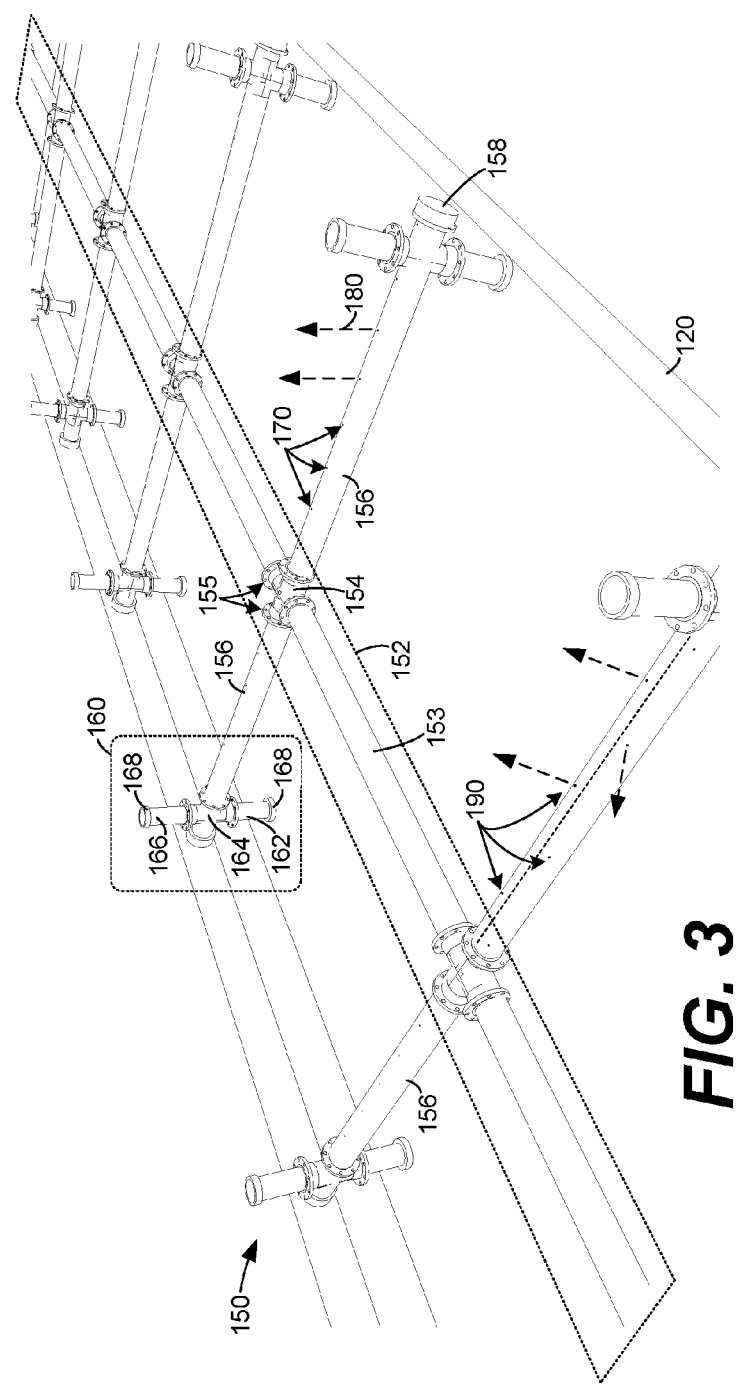
FIG. 3 illustrates a closer perspective view of the example exchanger in FIG. 2 according to one embodiment of the present disclosure.

FIG. 3 illustrates a closer perspective view of the example exchanger 150 in FIG. 2 according to one embodiment. In FIG. 2, the fluid apertures 170 of the exchanger extension arms 156 are more clearly shown. Generally, the fluid apertures 170 direct fluid from within the exchanger extension arms 156 into the storage tank 102 of in the tank 100. In this context, example jets 180 of fluid being directed upward into the storage tank 102 are illustrated in FIG. 2. In one embodiment, the fluid apertures 170 may be embodied as holes from outside to an internal hollow center of the exchanger extension arms 156. The fluid apertures 170 may be formed by drilling holes in the exchanger extension arms 156, for example, or by any other suitable manner. In other embodiments, the fluid apertures 170 may be formed as venturi nozzles (or other types of nozzles or apertures) in or on the exchanger extension arms 156. In this case, the nozzles may help agitate or distribute fluid in the tank 100.

As shown, the fluid apertures 170 are formed inline and are spaced substantially evenly apart (e.g., uniformly apart) along the exchanger extension arms 156 at a 12 o'clock orientation. In other embodiments, however, fluid apertures including the fluid apertures 170 and fluid apertures 190 may be formed at other orientations (e.g. at 8, 10, 2, or 4 o'clock orientations or combinations thereof) or staggered orientations as shown by the fluid apertures 190 and/or positions (e.g., non-uniformly) over the surface of the exchanger extension arms 156 to provide different and useful mixing of fluids. For example, one or more of the fluid apertures 170 may be formed at various angles from the top or bottom of the exchanger extension arms 156. Fluid apertures 170 formed to direct fluid out toward the bottom of the exchanger extension arms 156 may be relied upon to stir or mix particles that may settle upon the base 120 of the tank 100 (see, e.g., FIG. 5A). In other aspects of the embodiments, the exchanger extension arms 156 may include weep holes oriented toward the bottom of the exchanger extension arms 156 to permit any remaining water to slowly drip out and prevent freezing, etc.

In FIG. 3, various flanges 155 of the exchanger 150 are also more clearly shown. The flanges 155 may be present at ends of the central fluid conduit segments 153, the exchanger extension arms 156, and/or on the joints 154. Generally, the flanges 155 may be relied upon to join the central fluid conduit segments 153, the exchanger extension arms 156, and/or on the joints 154 together in fluid communication with each other. In some embodiments, a gasket may be placed between the flanges 155 of one or more of the central fluid conduit segments 153, the exchanger extension arms 156, and/or on the joints 154, to help prevent fluid from leaking between junctures in the exchanger 150. At the flanges 155, any suitable type of connections may be established with compression, glue, welding or hardware such as threaded bolts and nuts, to secure the central fluid conduit segments 153, the exchanger extension arms 156, and/or on the joints 154 together.

As shown in FIG. 3, each exchanger support 160 includes a downward tube 162, an upward tube 166, and a support joint 164. Flanges 155 of an exchanger extension arm 156 and the support joint 164 may be relied upon to secure ends of them together at one end of the exchanger extension arm 156. Similarly, flanges 155 of the downward tube 162 and the upward tube 166 may be relied upon to secure them to the support joint 164. Caps 168 may be fitted at the other ends of the downward tube 162 and the upward tube 166 to cap or seal off the downward tube 162 and the upward tube 166. In the configuration shown in FIG. 3, the cap 168 placed over the bottom end of the downward tube 162 rests upon the base 120 of the tank 100. The downward tube 162 and the upward tube 166 may be embodied as tubes or pipes formed from metal, metallic alloys, plastic, or any other rigid material suitable for supporting the exchanger 150. Similarly, the support joint 164 may also be formed from metal, metallic alloys, plastic, or any other material suitable for supporting the exchanger 150.

Figure 4:
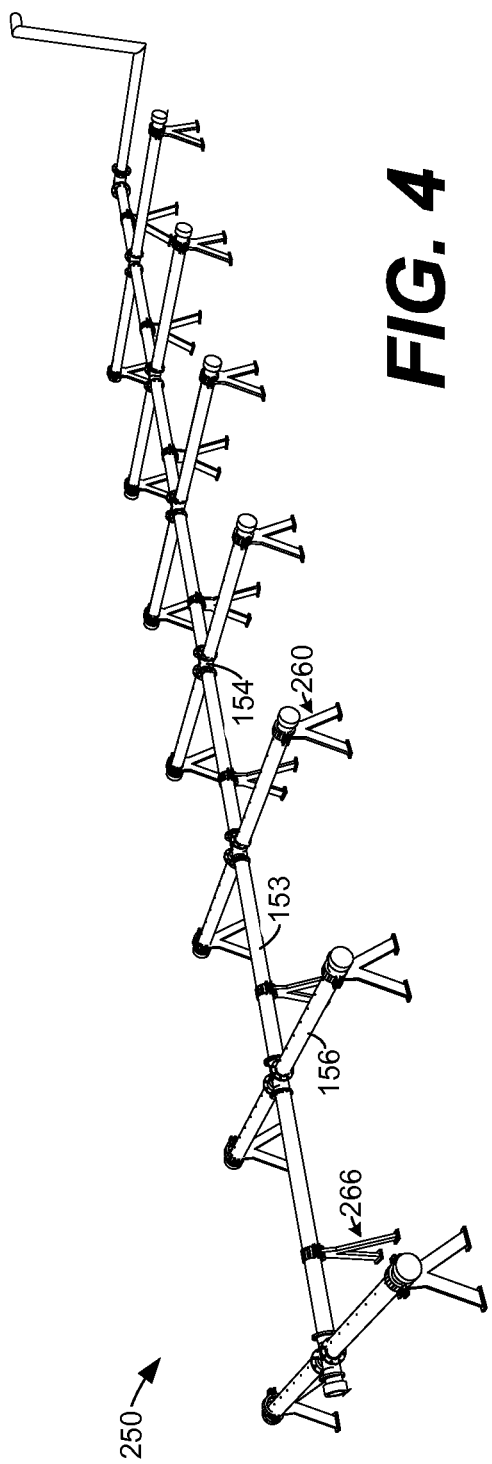
FIG. 4 illustrates a perspective view of an example exchanger according to another embodiment of the present disclosure.

FIG. 4 illustrates a perspective view of an example exchanger 250 according to another embodiment. The exchanger 250 in FIG. 4 is similar to the exchanger 150 in FIGS. 2 and 3. Particularly, the exchanger 250 includes the central fluid conduit segments 153 and the exchanger extension arms 156. However, rather than relying upon the exchanger supports 160 (FIGS. 2 and 3), the exchanger 250 includes peripheral exchanger supports 260 and central exchanger supports 266. As shown in FIG. 4, each peripheral heat exchanger support 260 holds up or supports one exchanger extension arm 156. Similarly, each central heat exchanger support holds up or supports one central fluid conduit segment 153.

FIG. 5A illustrates an end view of the example exchanger 250 in FIG. 4. In FIG. 5A, a side view of two peripheral exchanger supports 260 and a front view of the central exchanger support 266 are provided. As illustrated, the central exchanger support 266 includes right and left support legs, 267A and 267B, respectively. The central exchanger support 266 also includes, right and left support feet, 268A and 268B, respectively, at ends of the right and left support legs 267A and 267B. Additionally, the central exchanger support 266 also includes a cylindrical clamp formed of a top clamp half 269A and a bottom clamp half 269B.

In FIG. 5A, the exchanger 250 rests upon a base including a sloped floor having surfaces 502A and 502B that decline to a central point 504. To rest flat upon the sloped floor, the right and left support feet 268A and 268B are each inclined in respective different directions so as to rest flat on the sloped floor. Similarly, each of the peripheral exchanger supports 260 in FIG. 5A include inclined feet 261 to rest flat on the sloped floor. It is noted, however, that the inclined feet 261 of the peripheral exchanger supports 260 are inclined in a different orientation as compared to the right and left support feet 268A and 268B of the central exchanger support 266.

FIG. 5B illustrates a side view of the example exchanger 250 in FIG. 4 according to another embodiment. In FIG. 5B, the central point 504 of the sloped floor in FIG. 5A is longitudinally illustrated as declining from left to right. In this view, several of the central exchanger supports 266 are shown. As illustrated, the support legs of the central exchanger supports 266 are graduated in length from shortest to longest from left to right. In this way, each of the central exchanger supports 266 may rest upon the central point 504 of the sloped floor while maintaining the central fluid conduit segments 153 in a substantially level orientation. To the extent necessary, the support legs of one or more of the peripheral exchanger supports 260 may also be graduated in length to rest upon the sloped floor.

Figure 6:
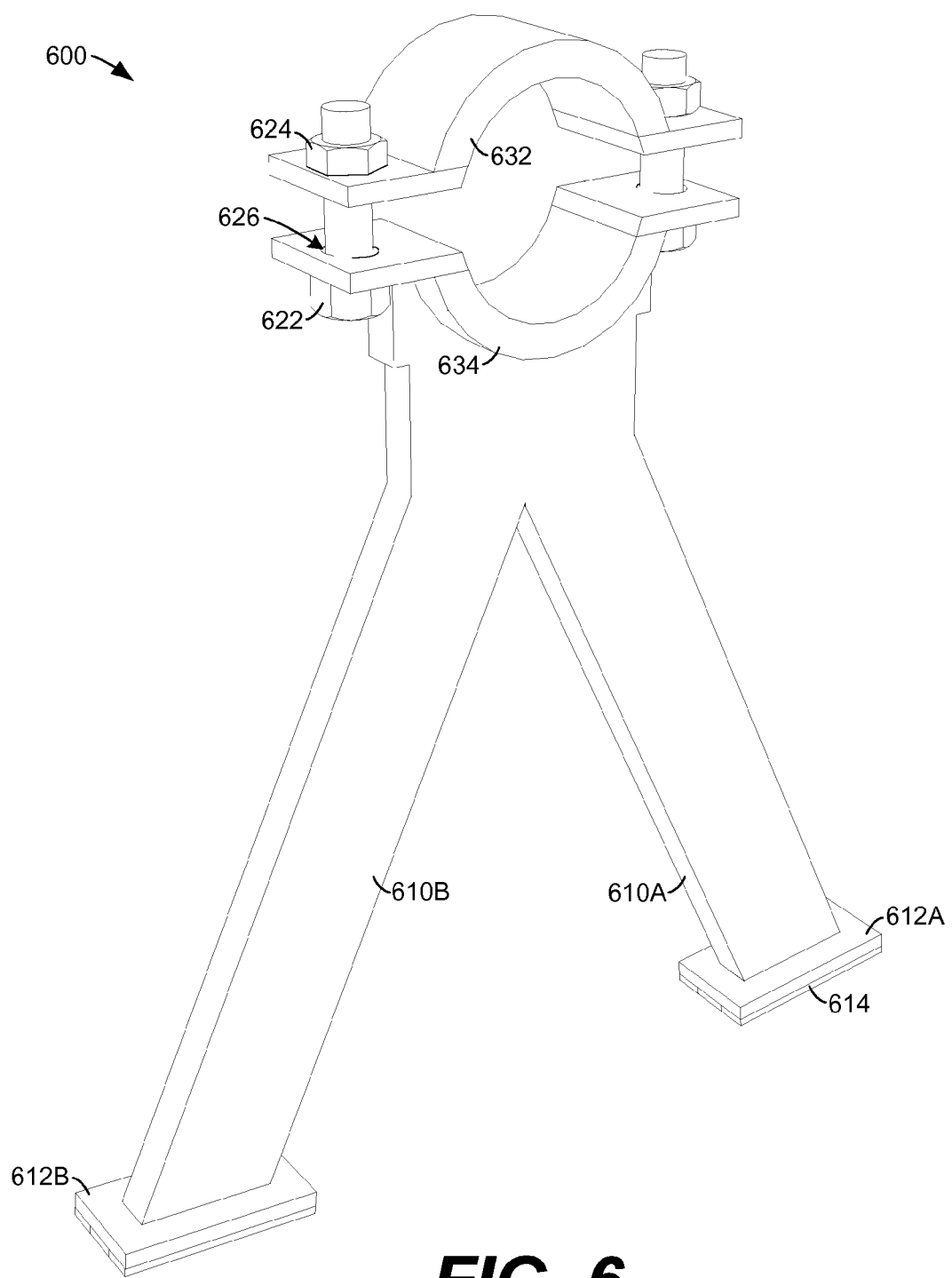
FIG. 6 illustrates a perspective view of an example exchanger support for the exchanger in FIG. 4 according to another embodiment of the present disclosure.

FIG. 6 illustrates a perspective view of an example exchanger support 600 for the exchanger 250 in FIG. 4. The exchanger support 600 may be relied upon as one or more of the peripheral exchanger supports 260 and/or central exchanger supports 266 for the exchanger 250 in FIG. 4. The exchanger support 600 may be formed from metal, metallic alloys, plastic, or any other material suitable for the purpose of supporting the exchanger 250 in FIG. 4.

The exchanger support 600 includes right and left support legs, 610A and 610B, respectively, right and left support feet, 612A and 612B, respectively, and a cylindrical clamp including a top clamp half 632 and a bottom clamp half 634. The cylindrical clamp may be installed around one of the central fluid conduit segments 153 and/or one of the exchanger extension arms 156 of the exchanger 250 in FIG. 4, for example. The top clamp half 632 and bottom clamp half 634 may be secured together using a threaded bolt 622 and corresponding nut 624, as shown in FIG. 6. In this context, the exchanger support 600 may include a mechanical interface 620 that extends out in proximity to a through-hole 626 in the bottom clamp half 634. The mechanical interface 620 may be relied upon to prevent the threaded bolt 622 from rotating while securing the threaded bolt 622. In one embodiment, the exchanger support 600 also includes a foot pad 614 at the bottom of one or more of the support feet 612A and 612B. The foot pad 614 may be formed from felt, plastic, or any other suitable material for preventing the support feet 612A and 612B from scratching other surfaces.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A frac tank heat exchanger, comprising:
 a trailer comprising a storage tank, a fill port, and a drain port; and
 a heat exchanger that extends over at least a portion of the storage tank, the heat exchanger comprising:
 a central fluid conduit in fluid communication with the fill port, the central fluid conduit comprising a plurality of joints, wherein the central fluid conduit extends aligned with a longitudinal centerline of a fluid storage tank;
 a plurality of heat exchanger extension arms, each of the plurality of heat exchanger extension arms extending from one of the plurality of joints and having a plurality of fluid apertures that direct fluid into the storage tank; and
 a first plurality of heat exchanger supports that support the central fluid conduit that extends aligned with the longitudinal centerline, and a second plurality of heat exchanger supports that support the plurality of heat exchanger extension arms, wherein the storage tank comprises a sloped floor that is sloped from a longitudinal edge to the longitudinal centerline, and the first plurality of heat exchanger supports that support the central fluid conduit are longer than the second plurality of heat exchanger supports that support the plurality of heat exchanger extension arms.

2. The frac tank heat exchanger of claim 1, wherein each of the first plurality of heat exchanger supports comprises a cylindrical clamp, at least one support leg, and at least one support foot.

3. The frac tank heat exchanger of claim 2, wherein the at least one support foot of each of the first plurality of heat exchanger supports is inclined to rest flat on the sloped floor.

4. The frac tank heat exchanger of claim 1, wherein the heat exchanger further comprises a cap at an end of at least one of the central fluid conduit or the plurality of heat exchanger extension arms.

5. A heat exchanger, comprising:
a central fluid conduit that extends substantially aligned with a longitudinal centerline of a storage tank;
a plurality of heat exchanger extension arms, each of the plurality of heat exchanger extension arms extending from the central fluid conduit and having a plurality of fluid apertures that direct fluid into a storage tank; and
a first plurality of heat exchanger supports that support the central fluid conduit and a second plurality of heat exchanger supports that support the plurality of heat exchanger extension arms, wherein a sloped floor of the storage tank is laterally sloped from a longitudinal edge of the storage tank to the longitudinal centerline, and the first plurality of heat exchanger supports are longer than the second plurality of heat exchanger supports.

6. The heat exchanger of claim 5, wherein the plurality of fluid apertures are formed inline and spaced substantially evenly apart along the plurality of heat exchanger extension arms.

7. The heat exchanger of claim 5, wherein the plurality of heat exchanger extension arms are formed as tubes and the plurality of fluid apertures comprise holes from outside of the tubes to an internal hollow center of the tubes.

8. The heat exchanger of claim 5, wherein:
the central fluid conduit and the plurality of heat exchanger extension arms are formed as tubes; and
the central fluid conduit comprises a plurality of joints that secure the central fluid conduit and the plurality of heat exchanger extension arms together in fluid communication with each other.

9. The heat exchanger of claim 5, wherein the heat exchanger further comprises a cap at an end of at least one of the central fluid conduit or the plurality of heat exchanger extension arms.

10. The heat exchanger of claim 5, wherein each of the first plurality of heat exchanger supports comprises a cylindrical clamp, at least one support leg, and at least one support foot.

11. The heat exchanger of claim 10, wherein the at least one support foot of each of the first plurality of heat exchanger supports is inclined to rest flat on the sloped floor.

12. The heat exchanger of claim 11, wherein the sloped floor of the storage tank further comprises a longitudinal slope, and support legs of the first plurality of heat exchanger supports are graduated in length along with the longitudinal slope of the sloped floor.

13. The heat exchanger of claim 5, wherein:
a respective one of the second plurality of heat exchanger supports is attached to a respective one of the plurality of heat exchanger extension arms proximal to an end cap that is at a distal end of the respective one of the plurality of heat exchanger extension arms.

14. The heat exchanger of claim 13, wherein:
each of the first plurality of heat exchanger supports comprises at least one support leg and at least one support foot inclined in a first direction; and
each of the second plurality of heat exchanger supports comprises at least one support leg and at least one support foot inclined in a second direction.

15. A tank, comprising:
a storage tank; and
a heat exchanger that extends over at least a portion of the storage tank, the heat exchanger comprising:
an exchanger tube having a plurality of holes spaced substantially evenly along a length of the exchanger tube, each of the plurality of holes penetrating from outside of the exchanger tube to an internal hollow center of the exchanger tube, the plurality of holes having staggered orientations from a top of the exchanger tube, wherein a first one of the plurality of holes is at a first angle from the top of the exchanger tube and a second one of the plurality of holes is at a second angle from the top of the exchanger tube, wherein the first angle and the second angle are different and the staggered orientations provide different mixing of fluids; and
an exchanger support that supports the exchange tube in a plane above a sloped floor of the storage tank, wherein the exchanger support comprises a cylindrical clamp, at least one support leg, and at least one support foot that is inclined to rest flat on the sloped floor.

16. The tank of claim 15, wherein the plurality of holes are formed inline.

17. The tank of claim 15, wherein the exchanger tube further includes at least one hole along a bottom of the exchanger tube.

18. The tank of claim 15, wherein the exchanger tube comprises:
a central fluid conduit; and
a plurality of exchanger tubes, each of the plurality of exchanger tubes extending from the central fluid conduit.

19. The tank of claim 15, wherein the exchanger tube comprises a central fluid conduit and a plurality of heat exchanger extension arms.

20. The tank of claim 19, wherein the central fluid conduit comprises a plurality of joints that secure the central fluid conduit and the plurality of heat exchanger extension arms together in fluid communication with each other.

* * * * *